United States Patent Office 3,188,449
Patented June 8, 1965

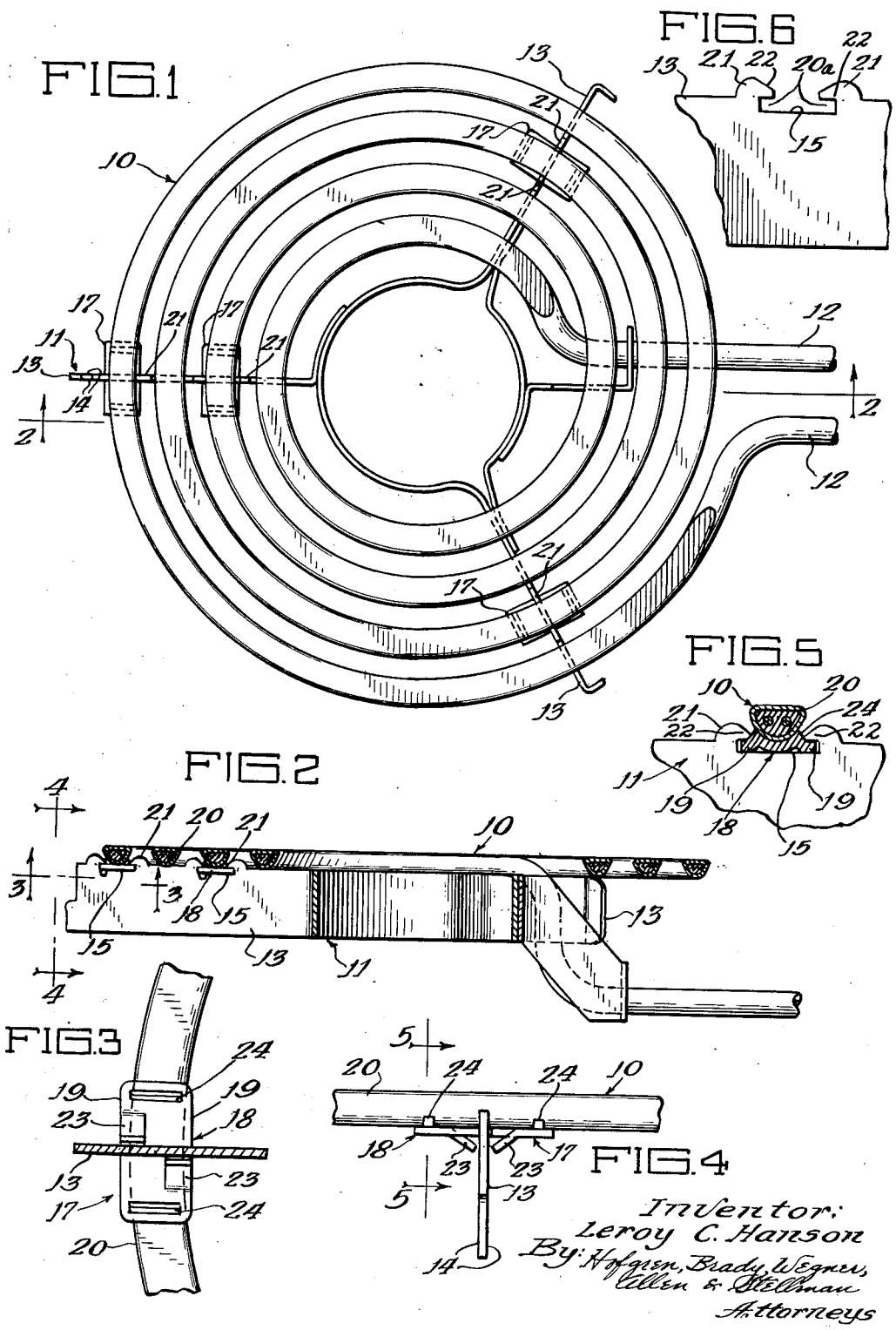

3,188,449
HEATING UNIT
Leroy C. Hanson, Elmhurst, Ill., assignor to
Ferro Corporation, a corporation of Ohio
Filed Feb. 23, 1962, Ser. No. 174,981
4 Claims. (Cl. 219—455)

This invention relates to a heating unit, and more particularly to a mounting particularly suited for use in electric heating units.

Electric heating units are commonly in the form of a coiled electric heating element mounted on a suitable support such as a spider. During heating and cooling, the heating element tends to expand and contract so that provision must be made for limited movement of the heating element on the spider. Considerable force is often applied through portions of a mounting connecting the heating element and spider, particularly since this mounting should limit movement of the heating element across the spider and should hold the heating element in a relatively flat plane so that pans and other utensils will be adequately supported thereon. Most present day heating elements are of the sheathed type in which a metallic sheath encases suitable insulating material and a resistance type electric heater. These mountings between the heating element and spider are usually in the form of a member clamped or welded to the sheath and loosely secured to the spider. In practice, it has been found that such connections may damage the sheath during use such that, for example, the clamped element may bite into or rub on the sheath, or a weld may tend to pull loose from the sheath and possibly rupture the sheath.

The primary object of this invention is to provide a new and improved heating unit.

An important object is to provide a new and improved mounting particularly suited for connecting a sheathed electric heating element and another member.

Still another object is provision of a new and improved heating unit in which a heating element is mounted for limited movement on a support, the mounting including a member firmly connected with the heating element and loosely attached to the support so that the effective forces tending to break the connection are effectively limited to shear stresses rather than prying or twisting forces between the member and heating element.

Additional objects and advantages of the invention will be apparent from the following description and drawings, in which:

FIGURE 1 is a fragmentary plan view of a preferred embodiment of the invention;

FIGURE 2 is a fragmentary vertical section taken generally along the line 2—2 of FIGURE 1;

FIGURE 3 is an enlarged, fragmentary horizontal section taken generally along the line 3—3 of FIGURE 2;

FIGURE 4 is an enlarged, fragmentary elevational view taken generally along the line 4—4 of FIGURE 2;

FIGURE 5 is a fragmentary vertical section taken generally along the line 5—5 of FIGURE 4; and FIGURE 6 is an elevational view, similar to FIGURE 5, but with parts removed for clearer illustration.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The invention is, in brief, directed to a heating unit and to a mounting particularly suited for use in a heating unit. An illustrated heating unit is in the form of an electric heating element mounted for limited movement on a suitable support, such as a spider. The mount is illustrated in the form of a rigid plate member firmly secured to the heating element, and to the support. More particularly this mounting is of such a nature that the effective forces acting between the member and heating element are effectively shear stresses, thus substantially eliminating prying or twisting action between the member and heating element.

With particular reference to FIGURES 1 and 2 of the drawings, the heating unit includes a heating element 10 mounted on a support 11. In the illustrated embodiment, heating element 10 is a sheathed, coiled electric heating element having opposite terminal ends 12 adapted to be suitably connected with power lines (not shown). Support 11 is illustrated in the form of a spider adapted to be received by a suitable support such as a drip pan of a range (not shown), and has outwardly diverging legs 13 each with opposite sides 14 and an edge spanning these sides and defining an upper supporting surface 15 for receiving a bottom portion of the heating element.

As the heating element heats and cools, it expands and contracts. In order to retain the heating element properly centered on the spider only limited play may be allowed between the heating element and spider 11 and the heating element should be restrained in such a manner that its upper surface remains substantially flat. To this end, mountings 17 are provided between heating element 10 and one or more spider legs 13 and as illustrated between all three legs and the heating element.

These mountings 17 between heating element 10 and spider 11 are best shown in FIGURES 2–5, wherein a plate member 18 is firmly secured to an outer sheath 20 of heating element 10 at points spaced longitudinally of the heating element, and is loosely connected with spider 11 for limited movement of the heating element across support surface 15 of spider leg 13 while effectively holding the heating element against substantial movement away from the spider to retain a generally coplanar surface on the heating element. Plate 18 is preferably flat and rigid and has opposite edge portions 19 which extend generally longitudinally of the adjacent portion of the coiled heating element and transversely of the leg. These edge portions 19 are received in opposed notches 20a of the spider leg. The notches are defined by abutments 21 extending upwardly from supporting surface 15 and fingers 22 extending toward each other from each abutment and overlying the supporting surface. The ends of fingers 22 overlie and are spaced just slightly from the top surface of plate 18 to hold the plate flat on the spider and the heating element flat, but so that the plate may move across spider leg 13 without binding. Abutments 21 are spaced from each other slightly more than the spacing between adjacent extremes of plate edge portions 19, so that the plate may move slightly across spider leg 13 in a direction transverse to heating element 10 and along the spider leg. As may best be seen in FIGURE 4, movement of plate 18 transversely across spider leg 13 in the longitudinal direction of heating element 10 is limited by tabs 23 which converge downwardly from plate 18 and loosely embrace opposite sides 14 of leg 13.

Heating element 10 is firmly attached to plate 18, and more particularly, a non-flat, convex outer face of heating element sheath 20 is received in saddle portions 24 of plate 18. These saddle portions are preferably equally spaced on opposite sides of the spider leg and are complementary to the configuration of the adjacent portion of the sheath. Thus, the sheath and plate are mated against radial movement of the heating element and these saddles are firmly secured to the heating element in any suitable manner, preferably by welding, or the like.

As the heating element 10 expands and contracts responsive to heating and cooling thereof it will normally move radially across the spider and in the direction of spider legs 13, and possibly circumferentially in the direction of its longitudinal axis and transversely across the spider legs. The mounting between heating element 10 and spider 11 permits limited movement in these directions while retaining the heating element against vertical movement so that its top surface remains substantially flat. Thus, the forces acting between heating element and spider 11 are effectively limited to shear stresses between heating element sheath 20 and saddle portion 24 of plate 18, and the construction is such as to effectively eliminate any prying or twisting action between the heating element and plate to assure a durable connection.

I claim:

1. A heating unit, comprising: a support having opposite sides and a supporting surface between said sides, a coiled heating element supported by said surface, a rigid plate received on said surface and having opposite edge portions extending generally transversely of said heating element, tabs depending from said plate and loosely embracing opposite sides of said support, opposed abutments extending from said surface and spaced apart a distance slightly greater than the distance between adjacent edge portions, fingers extending toward each other from said abutments and one closely overlying each of said edge portions, and saddle portions on said plate spaced apart on opposite sides of said support and generally complementary to and receiving an adjacent portion of said heating element and firmly connected with said heating element, whereby a general shear stress is applied between said heating element and plate and twisting or prying action between said heating element and plate is effectively prevented as the heating element expands and contracts responsive to heating and cooling thereof.

2. A heating unit comprising: a spider having outwardly diverging legs each with opposite sides and an edge between said sides, a generally coplanar coiled heating element having a metallic sheath with a bottom portion supported by the edges, a rigid plate received on said edge of one of said legs, means on said plate loosely embracing opposite sides of said one leg for limited movement of said plate transversely across said one leg, means on said one leg mounting said plate for limited movement along said leg, and saddle portions spaced apart on opposite sides of said support and generally complementary to and receiving an adjacent bottom portion of said heating element, and means firmly connecting said saddle portions with said heating element and said plate.

3. A heating unit comprising: a spider having outwardly diverging legs with opposite sides and edges between respective sides, a generally coplanar coiled heating element having a metallic sheath with a bottom portion having a non-flat transverse configuration supported by said edges, a rigid flat plate received on said edge of one of said legs and having opposite edge portions extending generally transversely of said one leg, tabs extending from said plate and loosely embracing opposite sides of said one leg, opposed abutments extending from said edge of said one leg and spaced apart a distance slightly greater than the distance between adjacent leg portions, fingers extending toward each other from said abutments and one closely overlying each of said plate edge portions, and narrow saddle portions of said plate generally parallel the related edge and substantially equally spaced apart on opposite sides of said support, said saddle portions being generally complementary to and receiving adjacent bottom portion of said heating element and firmly connected with said heating element, whereby a general shear stress is applied between said heating element and plate and twisting or prying action between said heating element and plate is effectively prevented as the heating element expands and contracts responsive to heating and cooling thereof.

4. A heating unit, comprising: a spider with a support having opposite sides and a supporting surface between said sides, a generally coplanar coiled heating element supported by said surface, means mounting said heating element for limited movement in its plane and effectively holding said heating element in said plane, said means including a rigid plate received on said surface and having opposite edge portions extending generally transversely of said heating element, tabs depending from said plate and loosely embracing opposite sides of said support, opposed abutments extending from said surface and spaced apart a distance slightly greater than the distance between adjacent edge portions, fingers extending toward each other from said abutments and one closely overlying each of said edge portions, and means firmly connecting said heating element with said plate, whereby a general shear stress is applied between said heating element and plate and twisting or prying action between said heating element and plate is effectively prevented as the heating element expands and contracts responsive to heating and cooling thereof.

References Cited by the Examiner

UNITED STATES PATENTS

| | | | |
|---|---|---|---|
| 2,413,536 | 12/46 | Wiegand | 219—461 |
| 2,877,334 | 3/59 | McOrlly et al. | 219—463 |
| 3,068,340 | 12/62 | Bremer et al. | 219—445 |

RICHARD M. WOOD, *Primary Examiner.*